Oct. 5, 1926.
S. A. HOGE
ELECTRIC SWITCH FOR AUTOMOBILES
Filed Nov. 10, 1924
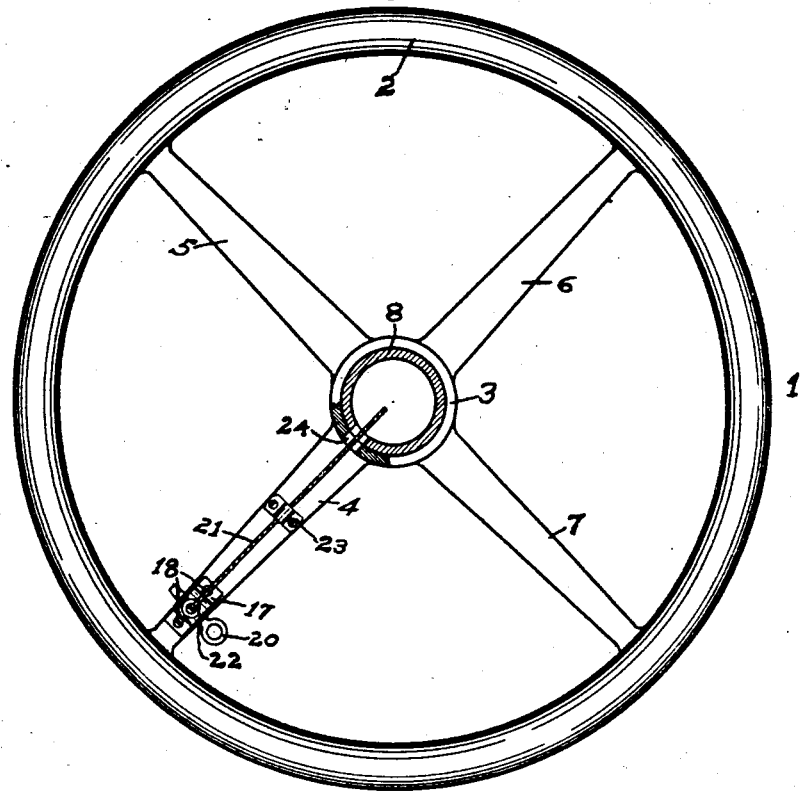
Fig. 1
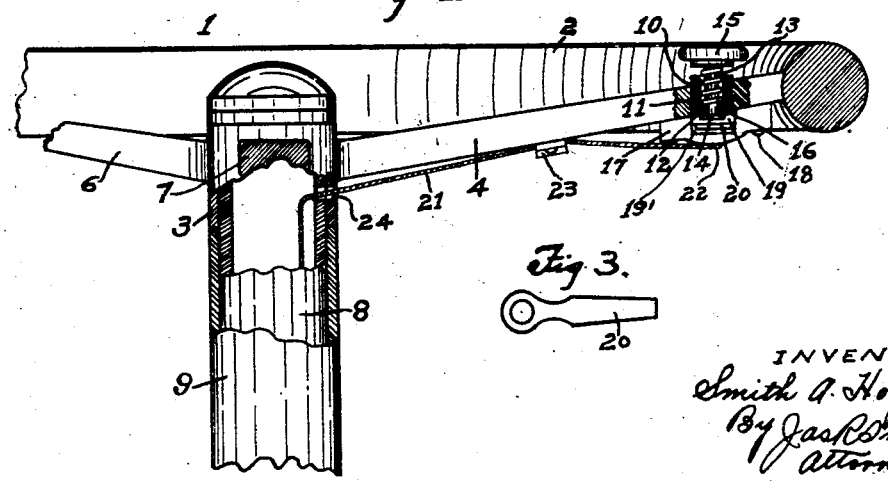
Fig. 2
Fig. 3
INVENTOR
Smith A. Hoge
By Jas R Snyder
Attorney Patented Oct. 5, 1926.

UNITED STATES PATENT OFFICE.

SMITH A. HOGE, OF RICES LANDING, PENNSYLVANIA.

ELECTRIC SWITCH FOR AUTOMOBILES.

Application filed November 10, 1924. Serial No. 748,869.

This invention relates to electric switches for automobiles, and while primarily intended for controlling the operation of the horn signal, it will be obvious that the device may be employed for lights control or for any other purpose wherein it is found to be applicable.

The primary object of this invention is to provide a switch of the class stated, which is adapted to be carried on the cross arm of the motor vehicle steering wheel in a position to accommodate the convenience of the driver, and which can be operated by a slight movement of the thumb or forefinger without removing the hand from the normal driving position, thereby providing instant and convenient control of the horn or lights and reducing accident hazards, trouble and inconvenience incident to operating a control switch necessitating the removal of the hand from the normal driving position on the steering wheel.

Further objects of the invention are to provide a switch of the type specified, which may be readily attached to a steering wheel of any construction and without the use of additional materials except that embodied in the invention itself, which is simple in its construction and arrangement, compact, strong, durable and efficient in its use, positive in its action, attractive in appearance, and comparatively inexpensive to manufacture and install.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawing forming a portion of this specification and wherein like numerals of reference designate corresponding parts throughout the several views:

Figure 1 is a bottom view of a motor vehicle steering wheel provided with a control switch in accordance with my invention.

Figure 2 is a fragmentary sectional view of a motor vehicle steering wheel embodying the invention.

Figure 3 is a plan view of the removable contact key.

Referring in detail to the drawing 1 denotes a motor vehicle steering wheel of the usual construction and consisting of the rim 2, the centrally disposed hub 3, and the cross-arms 4, 5, 6, and 7 integrally formed with the hub 3 and fixedly connected at their outer ends to the rim 2.

The steering wheel hub 3 is fixedly mounted on the upper end of the hollow steering stem 8 to turn therewith, and the latter in turn is revolubly mounted in the steering column 9.

The control switch is preferably mounted on the cross-arm 4 adjacent to the latter's connection with the rim 2. The switch comprises an externally threaded bushing 10 mounted for vertical adjustment in the threaded aperture 11 provided therefor in the cross-arm 4.

The bushing 10 is formed with an apertured bottom 12 through which extends a vertically disposed shiftable pin 13. The lower end of the latter is provided with a contact head 14, and the upper end thereof extends through and is disposed above the upper end of the bushing 10. A push button 15, constructed from insulating material, is attached to the upper end of the pin 13 and is adapted for shifting the contact head 14 to the operative or contacting position.

A spiral spring 16 is mounted on the pin 13 in the bushing 10 and normally tends to support the contact head 14 and associated parts in the elevated or inoperative position.

A supporting block 17, of insulating material, is secured by screws 18, against the under side of the cross-arm 4. The top of the block 17 is formed with a centrally disposed recess 19 in which a contact plate 19' is fixedly secured. The bushing 10 is so adjusted in the cross-arm 4 that when the push button 15 is depressed the head 14 cannot contact with the contact plate 19'. The latter is formed with forwardly tapering channeled top face adapted for the reception of a flat tapered contact key 20, which is removable and capable of establishing or completing the operating circuit when the contact head 14 is depressed thereon. The contact key 20 is maintained in position on the contact plate 19' by its wedging engagement in the tapered channeled top face of the latter. The removal of the contact key 20 will render the control switch inoperable, thereby preventing injurious tampering therewith by unauthorized persons.

The electrical conductor 21 is attached to the contact plate 19', as indicated at 22. The conductor 21 extends along the under side of the cross-arm 4 against which it is held by a clip 23, and enters the steering stem 8 through an aperture 24 formed in the steering stem 8 and in the hub 3 fixed thereto. By arranging the conductor in this manner no strain or pull is exerted upon it by the normal movement of the steering wheel 1 during the steering operation, and it will be properly maintained from view on the under side of the cross-arm 4.

By the use of my improved control switch the signal horn or lights may be conveniently controlled by the vehicle driver without necessitating the removal of his hand from the normal position on the wheel rim 3, thereby establishing a safety factor tending to minimizing accident hazards.

What I claim is:

1. A control switch for the purpose set forth adapted to be mounted on the cross-arm of a motor vehicle steering wheel and comprising a bushing mounted on said cross-arm, a fixed contact member insulated and supported from said cross-arm, a contact key removably mounted on said fixed contact member, and a shiftable contact member vertically supported in said bushing and capable of contacting with said contact key when depressed, said bushing being vertically adjustable in said cross-arm for regulating the spaced relation of said shiftable contact member and the said contact key.

2. A control switch for the purpose set forth adapted to be mounted on the cross-arm of a motor vehicle steering wheel and comprising a bushing mounted on said cross-arm, a fixed contact member insulated from and supported by said cross-arm, a contact key removably mounted on said fixed contact member, a shiftable contact member vertically supported in said bushing and capable of contacting with said contact key when depressed, said bushing vertically adjustable in said cross-arm for regulating the spaced relation of said shiftable contact member and the said contact key, and means engaging said shiftable contact member for normally maintaining the latter from contacting with said contact key.

3. The combination with a motor vehicle steering wheel including a plurality of cross-arms and a hub fixed to the steering stem, of a control switch comprising a bushing mounted in one of said cross-arms, a fixed contact member insulated from and carried on the under side of said cross-arm, said fixed contact member formed with a forwardly tapering channeled top face, a tapering contact key removably mounted in said channeled top face of the said fixed contact member, a shiftable contact member vertically supported in said bushing, said shiftable contact member normally spaced from said contact key and capable of engaging the latter when depressed, said bushing vertically adjustable in said cross-arm for regulating the spaced relation of said shiftable contact member and the said contact key, means engaging the said shiftable contact member for normally maintaining the latter from contacting with said contact key, said hub and steering stem provided with an aperture, and an electrical conductor connected with said fixed contact member arranged along the under side of said cross-arm and extending through said aperture into said steering stem, substantially as described and for the purpose set forth.

In testimony whereof I affix my signature.

SMITH A. HOGE.